Figure 6:
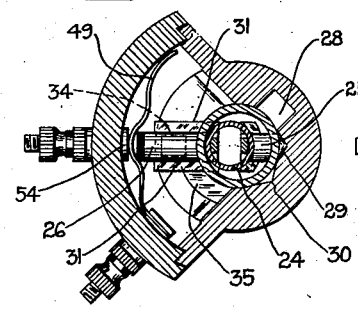

April 30, 1940.　　　　　C. B. LOWE　　　　　2,199,226
COINCIDENTAL LOCK
Filed Sept. 20, 1935　　　　4 Sheets-Sheet 1
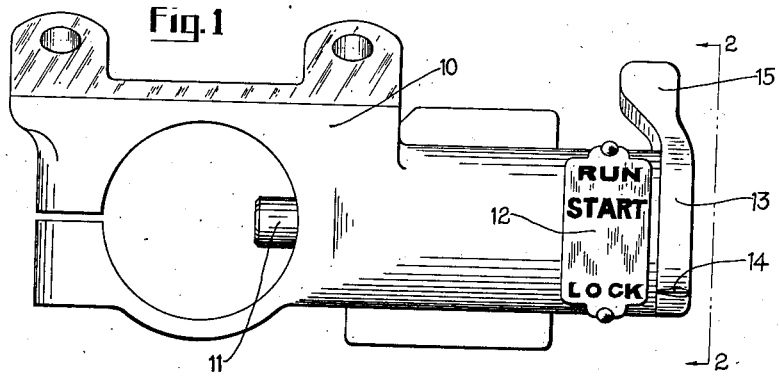
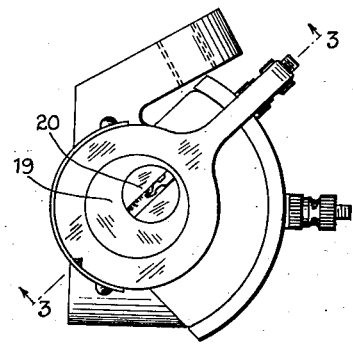
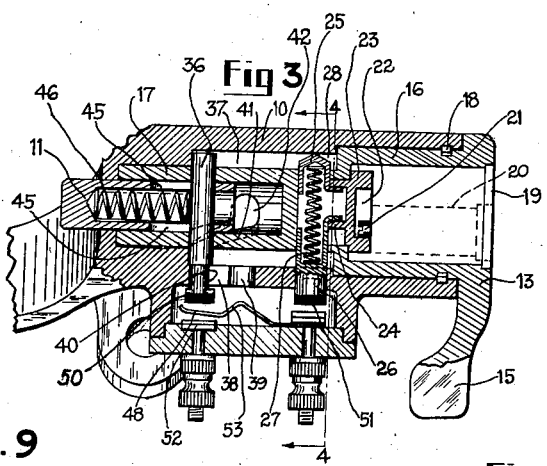
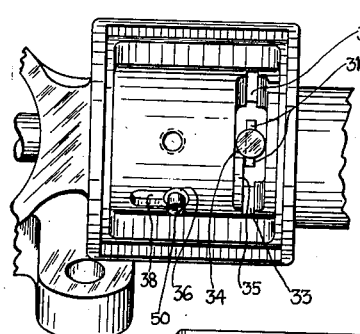
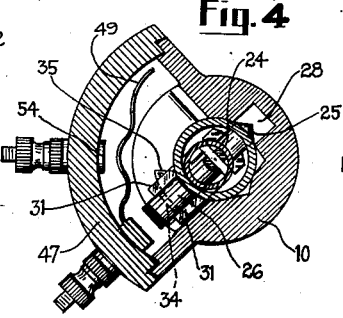
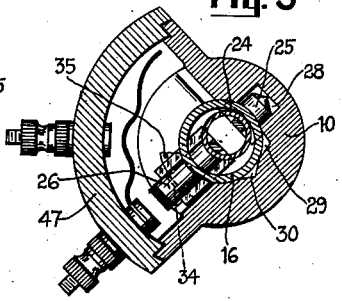
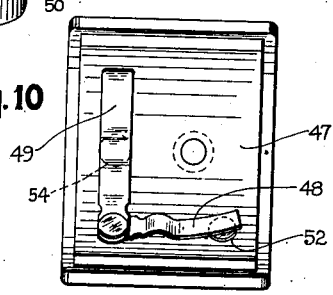
INVENTOR
Charles B. Lowe
BY
A. H. Golden
ATTORNEY April 30, 1940.　　　　C. B. LOWE　　　　2,199,226
COINCIDENTAL LOCK
Filed Sept. 20, 1935　　　　4 Sheets-Sheet 2

INVENTOR
Charles B. Lowe
BY
H H Golden
ATTORNEY

April 30, 1940.    C. B. LOWE    2,199,226
COINCIDENTAL LOCK
Filed Sept. 20, 1935    4 Sheets-Sheet 3

INVENTOR
Charles B. Lowe
BY
A. H. Golden
ATTORNEY

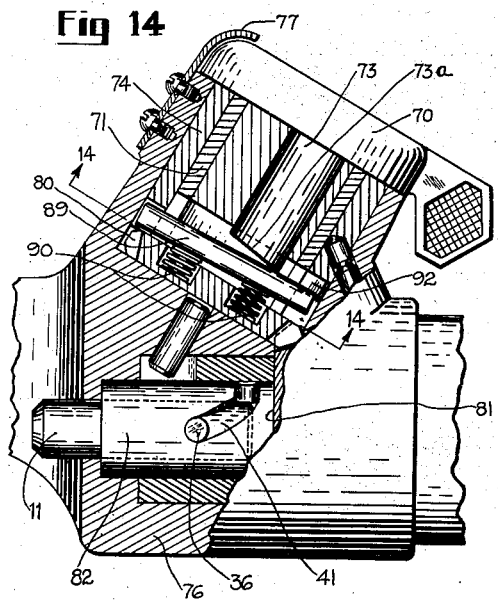
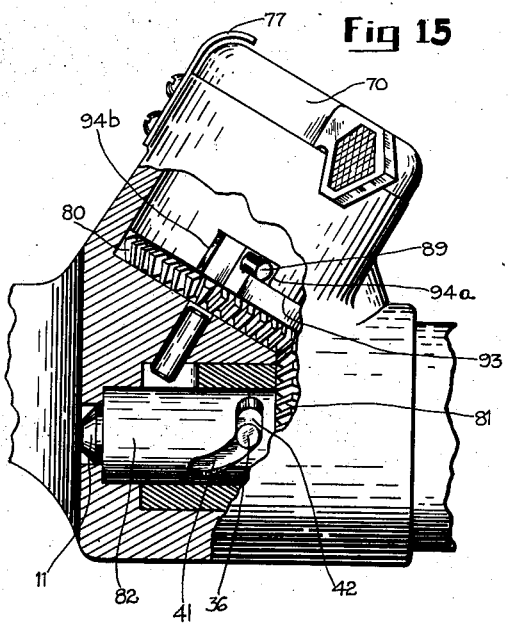
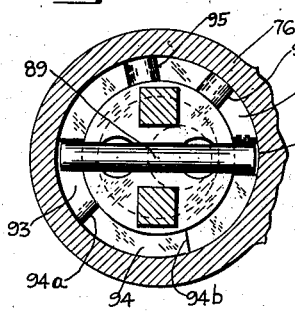
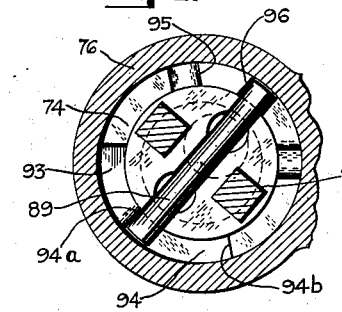
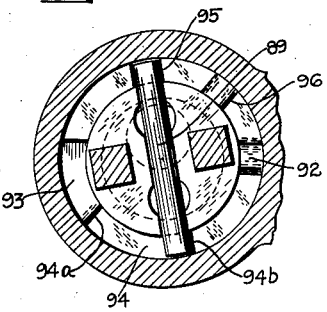
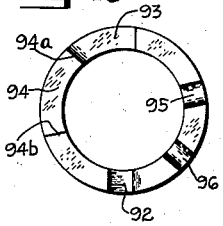
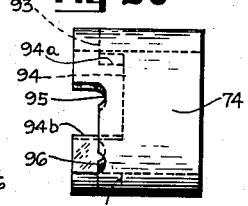
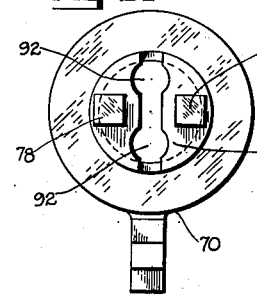
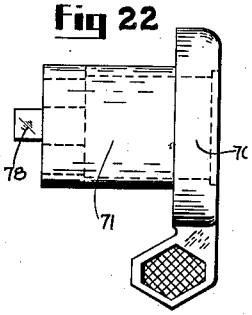
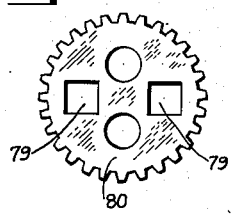
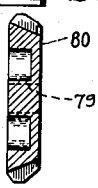

Patented Apr. 30, 1940

2,199,226

UNITED STATES PATENT OFFICE 2,199,226

COINCIDENTAL LOCK

Charles B. Lowe, Stamford, Conn., assignor to The Yale & Towne Manufacturing Company, Stamford, Conn., a corporation of Connecticut Application September 20, 1935, Serial No. 41,344

24 Claims. (Cl. 70—252)

This invention relates to what is known in the automobile industry as a coincidental lock. The lock is so termed because it is designed to lock up a vital part of the apparatus of the automobile at the same time that the ignition is turned off. The theory of a lock of this type is that the operator must necessarily turn off the ignition when he leaves his car, and will therefore lock up an essential operating element when he does so.

More particularly, the coincidental lock which I have conceived relates to the locking up of the steering column of an automobile at the time that the ignition is turned off. In locks of this type, and incidentally, there have been many developments in locks of this type in this art, one of the necessary commercial requirements is means for permitting operation of the switch mechanism without consequent operation of the steering column locking mechanism. An operation of this sort is necessary because frequently it is the desire of the owner to permit the car to coast, or to permit the car to be moved about a garage with the ignition off but with the steering column released. While the presence of this feature renders a lock not truly coincidental, yet it is generally required. To render the lock practically coincidental, it is, however, required that the steering column be locked before the key is removed.

As a matter of fact, because in the first coincidental locks it was impossible to turn off the ignition without simultaneously locking the steering column, many serious accidents resulted because operators unfamiliar with the particular locks turned off the ignition to coast down hill, thus locking the steering column in place. I shall in the specification, describe one modification in which switch manipulation is possible without the locking of the steering column, but in which it is necessary to lock the steering column before the key may be withdrawn. In a second modification which I shall describe, the locking will be completely coincidental.

It is naturally appreciated that in those locks in which it is possible to operate the switch without locking the steering column, as well as in those locks in which the locking is coincidental, it must be relatively difficult and must require a real operation to permit the locking up of the steering column, so that the steering column may not be locked up unconsciously by the operator while his car is in motion. Various means for accomplishing this result have been devised in this art, but most of these have embodied the use of a bolt mechanism which first moves axially from a locking to an unlocking position, and may then be rotated in its unlocking position to actuate the switch mechanism.

While a lock of this type is quite satisfactory, I have conceived the combination of a control member adapted through one continuous rotation to retract a locking bolt and thereafter control the ignition circuit. I have so arranged this control member that once it unlocks the steering column, it can no longer be moved back into locking position, but may continue its movement in the unlocking direction to control the ignition circuit by movement back and forth in a zone beyond the position in which it has unlocked the steering column. Preferably, this control embodies the operation of a control member and a bolt, but it should be understood that the control may be by the bolt alone if required.

More particularly, my invention embodies a locking bolt which carries a spring pressed locking plunger for actually locking the steering column, as is well known in this art. The bolt may be operated upon the release of key controlled locking means which may or may not include a control member. Upon release of the key controlled locking means and the control member, if one is used, the bolt may be moved from its locking position to a second, or release, position, and once it reaches this second or release position, it is immediately locked against movement back into locking position.

Preferably, although such action is not necessary, I arrange to utilize the means which lock the bolt in its locked position for also locking it in its second or release position. The bolt may be moved, however, in a limited zone beyond its release position, or the control means for the bolt may be moved in a limited zone beyond the release position for controlling the ignition circuit. In order to move the control means and the bolt back into locking position, it is necessary to operate once again the key controlled locking means. In this way, after a first operation of key controlled locking mechanism, my bolt is released, and by continuous movement of the bolt, I obtain a releasing of the steering column and a switch operating action, and I make it impossible to relock the steering column without a second operation of the key mechanism.

As indicated above, the same means which locks the locking bolt in its steering column locking position also operates to lock the bolt against movement from its released position back to its locking position. For these means I have devised rather interesting types of bolts movable into two positions by a cam carried by the plug of the locking cylinder. This combination comprises an extremely important part of my invention.

As a further feature of my invention, I utilize a very interesting assembly between the spring pressed locking plunger and the steering column locking bolt. In the preferred embodiment of this assembly, the spring pressed plunger may be retracted by the bolt and may be spring pressed relatively to the bolt and be held assembled relatively to the bolt by a very simple type of pin. This also is a very important feature of my invention.

While I have discussed several of the salient features of my invention, it should be understood that there are other features of extreme value which will be described more in detail below. While I have shown and will probably describe two different embodiments of my invention, it should also be understood that other modifications will readily occur to those skilled in the art, and that the claims which should be granted me should be of such scope and should receive such interpretation as to prevent the utilization of the principles disclosed herein by others who might embody those principles in different mechanisms.

Figure 11:
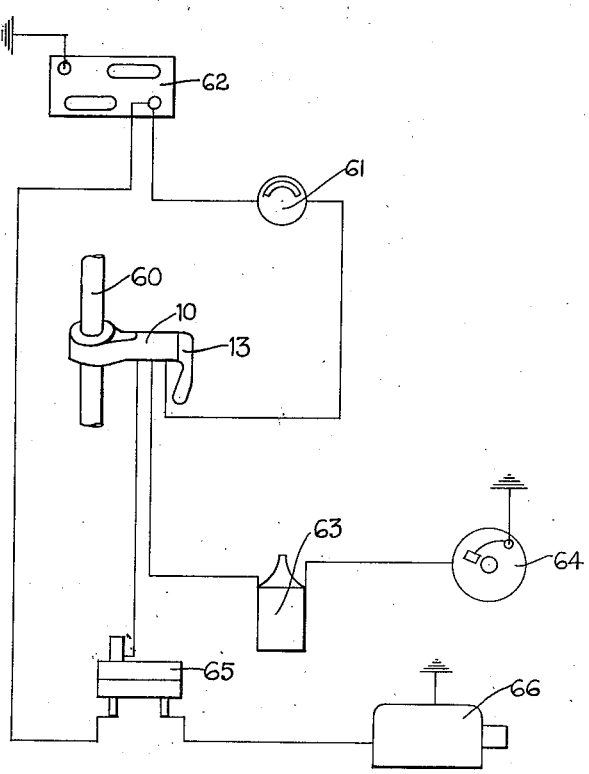
Figure 12:
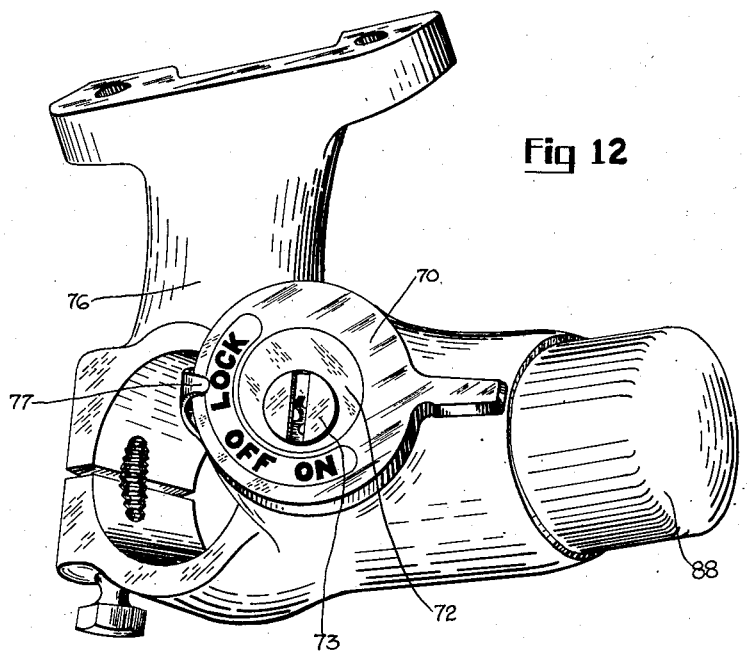
Figure 13:
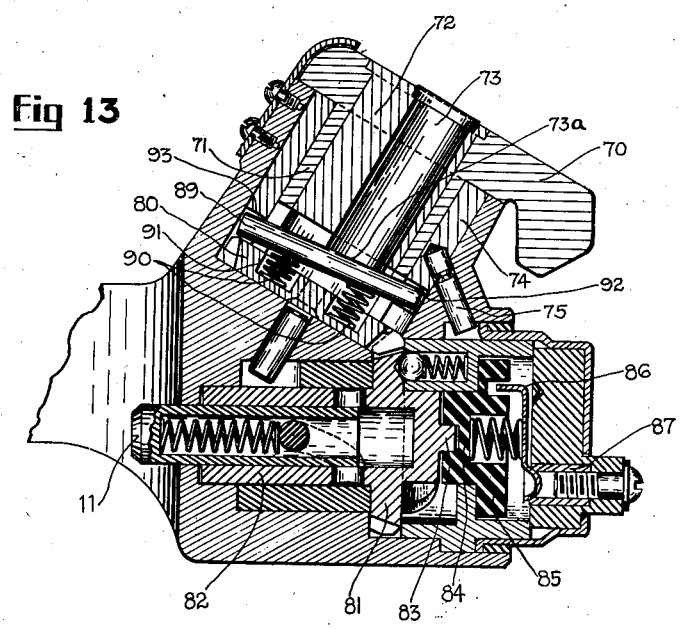

Referring now more particularly to the drawings, Fig. 1 is a plan view of one modification of my invention. Fig. 2 is a view of Fig. 1 along lines 2—2 of Fig. 1. Fig. 3 is a view taken along lines 3—3 of Fig. 2. Figs. 4, 5, 6, 7 and 8 are taken along lines 4—4 of Fig. 3 and show the operating parts in various operating positions. Fig. 9 is a view of the mechanism with the top plate removed. Fig. 10 is an under view of the top plate which is removed to show the parts of Fig. 9. Fig. 11 is a diagram of the ignition and starting circuits of an automobile in relation to the mechanism of my invention. Fig. 12 is a perspective view of a modification of my invention, while Fig. 13 is a section through the modification of Fig. 12. Figs. 14 and 15 are partial sections of the invention taken somewhat along the lines of Fig. 13. Figs. 16, 17 and 18 are views along lines 14—14 of Fig. 12, illustrating the parts in several controlling positions. Figs. 19 and 20 are respectively end and side views of a locking bushing. Figs. 21 and 22 are respectively end and side views of a control member utilized in the modification of Fig. 12. Figs. 23 and 24 are respectively side and sectional views of a control gear utilized in this modification.

Referring now more particularly to the drawings and especially to Figs. 1–10, inclusive, reference numeral 10 indicates a housing member adapted to be secured in proper relation to a steering column so that the locking plunger 11 carried thereby may be in a position to lock the steering column. The general assembly illustrated in Fig. 1 is quite well known in the art and it is only the control of the locking plunger 11 and the ignition circuit to which my invention applies. An indicating plate 12 is mounted on the housing 10 and a control member 13 rotates relatively to the plate 12, its index 14 being adapted to point opposite the various indicia on the plate when the control member is in various controlling positions.

The control member 13 has a handle portion 15 and is integral with a sleeve 16 which extends rearwardly terminating in what I will term a bolt portion 17. A retaining spring 18 is adapted to maintain the control member 13 against outward movement from the housing 10, as will be readily appreciated. A pin tumbler cylinder 19 is inserted into the sleeve 16 and is held therein by usual means, such as are well known in this art and need not be shown. The cylinder 19 has a key plug 20 of the regular type, and this key plug carries a pin 21 which operates in a slot 22 of a cam 23 mounted in bearing relation to sleeve 16. The cam 23 has a circular end cam surface 24 which cooperates with spring pressed bolts 25 and 26 pressed in opposite directions by a spring 27, as is quite apparent from Fig. 3.

The housing 10 is equipped with a locking slot 28, best illustrated in Figs. 3–8, inclusive, which cooperates with the bolt 25. The housing 10 is also equipped with detent slots 29 and 30 which are adapted to cooperate with the bolt 25 for yieldingly retaining that bolt in various positions, and thus yieldingly retaining the control member 13 in the same various positions.

Fig. 5 illustrates the parts when the control member 13 is locked against movement. It is therein seen that the bolt 25 is maintained within the locking slot 28 of the housing 10. Upon insertion of a proper key into the key plug 20, that plug may be rotated in a manner well understood by those skilled in the art so as to rotate the cam surface 24 from the position of Fig. 5 to the position of Fig. 4. By this rotation, bolt 25 is moved almost completely out of the slot 28 and it is possible thereafter to rotate the control member to its position of Fig. 6, the angular end surface on the bolt 25 permitting its complete projection from the slot 28 against the force of its spring 27. Naturally, upon reaching the position of Fig. 6, the bolt portion 25 will snap into the detent slot 29.

The bolt 26, it will be noticed, is equipped with lugs 31 which guide it relatively to slots 32 and 33 of the housing 10. The bolt 26 is slotted at 34, or cut away at 34, to accommodate a segmental abutment 35 on the housing. In the position of the parts in Fig. 5, the segmental abutment 35 rides in the slot 34 of the bolt. When the cam member 24 is rotated from the position of Fig. 5 to the position of Fig. 4, it releases the bolt 26 for spring pressed movement, but the coaction of the abutment 35 with the slot 34 maintains the bolt against the pressure of its spring 27 and in the position of Fig. 4. Upon movement of the parts from Fig. 4 to Fig. 6, the segmental abutment 35 is left behind slot 34 so that the bolt 26 may spring outwardly to the position illustrated in Fig. 6, bringing it to the extreme end of its travel as permitted by the cam surface 24.

Figure 7:
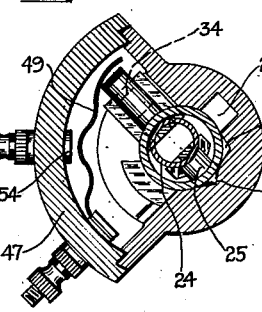

The control member may move freely from its position of Fig. 6 to its position of Fig. 7, and this movement will be resisted only slightly by the bolt 25 snapping out of the detent slot 29 and into the detent slot 30. However, rotation back of the control member from Fig. 6 to Figs. 4 and 5 will be prevented because a solid portion of the bolt 26 will be opposite the segmental abutment 35 and will prevent such movement. In order to allow movement back from Fig. 6 to Fig. 5 of the control member, it is necessary to rotate the cam 23 so as to move the cam surface 24 from the position of Figs. 6 and 7 to the position of Fig. 8 which is, incidentally, the position of the cam surface in Fig. 5.

Figure 8:
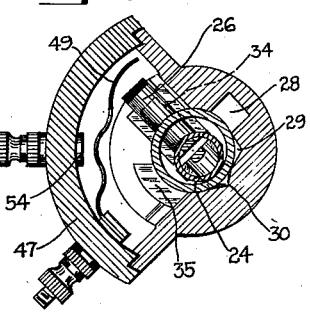

Through this rotation, the bolt 25 is released by cam surface 24 for spring pressed movement but remains either in the detent slot 29 or the detent slot 30, depending upon whether or not the mechanism is in the position of Fig. 6 or the position of Fig. 7. The bolt 26 is, however, retracted and held against the pressure of spring 27 in its position of Fig. 8. In this position, its slot 34 is once more aligned with the segmental abutment 35 so that counterclockwise rotation of the control member from Fig. 8 to Fig. 5 is possible. It is easily understood that once the bolt 25 reaches its position of Fig. 5 after movement from Fig. 8, it will snap into locking slot 28, locking the control member against movement until the same surface 24 has once more been operated into the position of Fig. 4.

The bolt portion 17 which is integral with the sleeve 16 of the control member 13 operates during the initial part of the rotation of the control member 13 from Figs. 4 and 5 to Fig. 6, to retract the locking plunger 11. This is accomplished by utilizing a pin 36 arranged for lateral movement relatively to the housing 10 through its sliding cooperation with slots 37 and 38 in that housing. The slot 38 is enlarged at 39 so that the body portion of the pin 39 may enter therein. Once the pin moves to the left of the portion 39, its neck 40 will confine it in the slot 38 against downward movement from the position of Fig. 3. This is a valuable use of member 36 as an assembly member, in addition to its other uses which will be described presently.

The pin 36 operates in a cam groove 41 of the bolt portion 17 (Fig. 3) so that as the portion 17 rotates, it acts to move the pin from its position in Fig. 3 to its position in Fig. 9. The cam groove 41 has a neutral portion 42 so that after the retraction of the pin 36 to its position of Fig. 9, it is possible for the bolt portion 17 to rotate relatively to the pin 36 without moving the pin axially.

The plunger 11 is slotted as at 45. The pin 36 inserted into the slots 45 acts to retain the plunger member 11 and acts to move the plunger 11 axially to the right from the position illustrated in Fig. 3 when the portion 17 is rotated. The spring 46 acts between the pin 36 and the plunger 11 to maintain the plunger 11 spring pressed in a full outward position. The purpose of this arrangement is to permit rotation of the control member 13 and bolt portion 17 into a locking position, when the plunger 11 is maintained against the spring pressure 46 from movement into its locking position by a solid portion of the steering column.

When, however, the steering column is rotated so as to bring the bore into which plunger 11 is adapted to enter opposite plunger 11, the plunger will be adapted to drop into the bore and thereby lock the steering column against rotation.

For controlling the ignition and starting circuits coincidentally with the operation of the plunger 11, I utilize a cap member 47 having a pair of spring contacting members 48 and 49 which are controlled and operated by an insulation piece 50 on the pin 36 and an insulation piece 51 on the bolt member 26. When the pin 36 moves from its position of Fig. 3 to its position of Fig. 9, it acts to close a circuit at the binding post 52 by cooperating with the hump portion 53 of the contact member 48. The closing of the circuit at the binding post 52 is adapted to close the ignition circuit of the automobile.

The insulation piece 51 on the bolt 26, in turn, in moving from the position of Fig. 4 to the position of Fig. 6, cooperates with the member 49 to close a circuit at binding post 54, as is best shown in Fig. 6. The closing of the circuit at the binding post 54 closes the circuit through the starting mechanism. Thus, in the position of the parts in Fig. 6, there is a closing simultaneously of the circuits through the ignition system and through the starting circuit. In this position of the parts, the indicating member 14 will be opposite the word "Start" on the dial 12. As soon as the engine starts, the operator will move the control member 13 to bring the indicator opposite the word "Run" on the dial 12, or in the position of the parts illustrated in Fig. 7, thus opening the circuit at the binding post 54 and stopping the operation of the starting motor.

If now it is desired to go from Fig. 7 back to Fig. 5 to lock up the steering apparatus and turn off the ignition circuit, the operator retracts the bolt 26 by rotating the key plug and moves the control member back to the position of Fig. 5 in one sweep, opening the ignition circuit and restoring the parts to the locked position of Figs. 3 and 5. Of course, the retraction of bolt 25 will cause it to return to its initial position in Fig. 5 without closing the starting circuit.

It is thought that the operation of the parts described will be quite clear, but it may be best to review the same. Insertion of a key into the plug 20 will rotate the cam 23 through means of pin 21 and slot 22, and move the cam surface 24 so as to retract the bolt 25 from the locking slot 28 and release bolt 26. Control member 13 with its sleeve 16 and bolt portion 17 may then be rotated, moving the plunger 11 from the position of Fig. 3 to a position corresponding to that of the pin 36 in Fig. 9. This is adapted to release the steering column and to close the ignition circuit through cooperation of the insulation member 50 of pin 36 with contact member 48, closing the circuit at binding post 52. At the same time, the bolt member 26 moves into its position of Fig. 6 and closes the circuit of the starter. As soon as the starter has operated to start the motor, the control member 13 is moved to the position of Fig. 7, opening the starting circuit at binding post 54. This movement is possible without actuation of plunger 11 and pin 36 because of the portion 42 on cam slot 41. When it is desired to move the mechanism to a full locking position once again, the key plug 20 is rotated to move the bolt 26 from its position of Fig. 7 to its position of Fig. 8. Thereafter, counterclockwise rotation of the control member 13 is possible and brings the bolt member 25 opposite the slot 28 so that it may enter freely into that slot locking the parts in the initial position of Fig. 5. This is accomplished, of course, without actuation of contact member 49.

Fig. 11 illustrates one form of circuit with which my invention of Fig. 1 is adapted to cooperate. In Fig. 11, reference numeral 60 indicates the steering column which is adapted to be locked. An ammeter is indicated by reference numeral 61, the battery by reference numeral 62, the ignition coil by reference numeral 63, and the distributor by reference numeral 64. At 65 I show a starting motor switch, while at 66 the starting motor is shown. The switch 65 is a cut-out or emergency switch usable for closing the starting circuit without going through the locked circuit. The control of the starting circuit and the control of the circuit of the coil 63 and the distributor 64 by my member 13 will be quite apparent to those skilled in the art. The starting motor circuit, and the coil and distributor circuit, respectively, are in parallel, and both may be closed at the same time, or only the ignition circuit may be closed while the starting motor circuit is held open.

I shall now describe the modification of Figs. 12-24. In describing that modification, I prefer to use reference numerals for most parts different from those applied to Figs. 1-10. I illustrate a control member 70 and a sleeve 71 in which is mounted a cylinder 72 carrying a key plug 73 mounted for rotation relatively to a locking bushing 74 maintained in position by a pin 75. The housing is designated by reference numeral 76 and represents the conventional type of coincidental lock housing now utilized for locking steering columns. An index point 77 on the housing cooperates with indicia on the control member 70 in somewhat the opposite manner from that illustrated with regard to the modification of Fig. 1. The end of the sleeve 71 is equipped with lugs 78 which fit into depressions 79 of a beveled gear 80 for rotating that gear integrally with the sleeve 71. The beveled gear 80 is in turn maintained in driving engagement with a second beveled gear 81 which is integral with a bolt 82 operating in the same manner as bolt portion 17 of the modification of Fig. 1.

On one end of beveled gear 81 is a lug 83 which is maintained in engagement with a slot 84 of an insulation member 85 adapted to operate a switch plate 86. The switch plate 86 and the contacts with which it cooperates are of the usual type well known in this art and need not be described more in detail. It need only be said that when the switch plate 86 is in the position illustrated in Fig. 13, the ignition circuit is off, but when it is in a position rotated 90° from that of Fig. 13, the ignition circuit is on. In this modification, as will be appreciated at this time, the starting circuit is eliminated and only the ignition circuit is controlled. For covering the binding post 87 which cooperates with switch plate 86, and the various other switch parts, I utilize a cap 88 shown quite clearly in Fig. 12.

The plug 73 has a cam surface 73a which cooperates with a unique form of locking pin or bolt 89, spring pressed by springs 90 against the cam surface 73a. The springs 90 are mounted in bores 91 of the gear member 80 and enter the sleeve 71 through openings 92, best illustrated in Fig. 21, so as to actuate the pin or bolt 89 in the manner shown. The pin 89 cooperates with the rather unusual end surface of a locking bushing 74 which is best illustrated in Figs. 19 and 20. In the position of Fig. 13, the locking pin 89 is maintained as shown in Fig. 18 relatively to the end surface of the locking bushing 73, and its right hand end is in a locking slot 92 while its left hand end is pressed against the ledge 93 of the end surface of bushing 74. Before proceeding further, it should be emphasized that in principle the bolt or pin 89 coacts with the key plug just as do bolts 25 and 26 of the first modification.

If now the key is inserted into plug 73 and the plunger is rotated to its position of Fig. 14 from its position of Fig. 13, it acts to move the right hand end of the pin 89 almost out of the locking slot 92. Thereafter, the sleeve 71 and the control member 70 may rotate, carrying the pin 89 to the position of Fig. 17, which is the position corresponding to the off position of the control member 70. This movement is resisted slightly by the pin 89 cooperating with the end surface of the slot 92 because, as will be remembered, it is not moved completely out of the slot 92 by rotation of the plug 73. This coaction is similar to that of bolt 25 of the first modification with the slot 28.

In this movement the right hand end of pin 87 moves into detent slot 96, and the left hand end of the pin 89 moves off the ledge 93 into the slot 94 under the influence of springs 90. In this position of the parts, which, as was previously stated, is shown in Fig. 17, it is impossible for the sleeve 71 and the control member 70 to rotate back to the locked position corresponding to Figs. 13 and 18, because the pin 89 will abut the end surface 94a of the slot 94 and will prevent such rotation. The control member 70 and the sleeve 71 may, however, rotate counterclockwise from the position of Fig. 17 to the position of Fig. 16 bringing the pin 89 against the end surface 94b of the slot 94 while the other end of the pin 89 moves into the detent slot 95. It will be understood that detent slots 95 and 96 correspond to detent slots 29 and 30 of the modification of Fig. 1 and operate in substantially the same way to yieldingly resist the movement of the control member 70 from one position to another. It will be readily appreciated that the pin 89 will permit movement of the control member from the position of Fig. 16 to the position of Fig. 17, but will prevent movement back to Fig. 18 until the plug 73 is rotated back to its position of Fig. 13 so as to move the left hand end of pin 89 out of the slot 94 and substantially into the plane of the portion 93.

The rotation of the sleeve 71 and therefore its gear member 80 is adapted through the cooperating gear member 81 to move the bolt portion 82 and the plunger 17 in the same manner as the integral movement of the sleeve 16 and the bolt portion 17 of the first modification move the plunger 11.

It will probably be helpful in the consideration of the modification of Figs. 12-24, inclusive, to describe one complete operation. A key is inserted into the plug 73 of the cylinder 72 and the plug is rotated so as to bring its cam portion 73a from the position of Fig. 13 to the position of Fig. 14. This withdraws the pin 89 from the locking slot 92 of the locking bushing 74 so that the control member 70 may rotate from the position of Figs. 13, 14 and 18 to the position of Fig. 17. This brings the designation "off" on the control member 70 opposite the indicator 77 and designates an unlocked position of the bolt and the plunger 11 and an open ignition circuit. At this point, the pin 89 has moved into the slot 94 and will thereafter prevent movement backward from the position of Fig. 17 to the position of Fig. 18. Continued movement of control member 70 to the position of Fig. 16 is possible, however, bringing the pin 89 against the abutment 94b at the end of the slot 94 and in this position of the parts, the ignition circuit is closed. The operator may move the control member 70 back to the position of Fig. 17, opening the ignition circuit, but he cannot move the member 70 back to locking position without once again operating the key plug 73, because of the cooperation of the pin 89 with the end surface 94a of the slot 94, as illustrated in Fig. 17. If the key plug 73 is rotated to move the cam surface 73a from the position of Fig. 14 back to the position of Fig. 13, then pin 89 will be moved against the pressure of its springs 90 forcing the said pin out of the slot 94 and into the plane of the surface 93, thus permitting clockwise rotation of the parts to the position of Fig. 18 from Fig. 17. In this position, the plunger 11 will be permitted to press outwardly into full steering post locking position.

I should like to reiterate once again that the basic principle of my invention involves key controlled operation of a locking bolt, or a locking bolt and controlling member, whereby to move the locking bolt from a locking to a release position, and thereafter close an ignition circuit, the closing of the ignition circuit being accomplished by movement beyond the said release position of the bolt; providing means for preventing backward movement of the bolt to a locking position, but allowing such backward movement upon operation of a key operated mechanism. I believe that many modifications utilizing the basic principle disclosed will readily occur to those skilled in the art, and I feel myself entitled therefore to a broad monopoly along the lines of the claims appended hereto.

I claim:

1. In a device of the class described, a movable member, a locking device, an electric circuit, means whereby continuous movement of said member first actuates said locking device to release position and then closes said circuit, and means for automatically locking said movable member against backward movement once it has moved into position to actuate said locking device to release position, while permitting its continued movement to close said circuit, and a key operated lock for releasing said movable member from said automatically locking means.

2. In a device of the class described, a movable control member, locking mechanism adapted to lock said member in an initial position, key operated means adapted to release said control member from said locking mechanism for movement in a predetermined direction, means cooperable with said locking mechanism after predetermined movement of said member to lock said member against return to said initial position while permitting its continued movement, said locking mechanism being operable by said key operated means to release said member for return to its initial position.

3. In a device of the class described, a movable control member, lock mechanism adapted to lock said member in an initial position, a key operated plug adapted to actuate said lock mechanism to release said control member for movement in a predetermined direction, means cooperable with said lock mechanism after a predetermined movement of said control member to lock said member against return movement to said initial position, while permitting continuing movement thereof, said key operated plug being adapted to release the lock mechanism from said means to permit movement of said control member back to its initial position.

4. In a device of the class described, a movable control member, bolt mechanism adapted to lock said member in an initial position, a key operated plug adapted to actuate said bolt mechanism to release said control member for movement in a predetermined direction, means cooperable with said bolt mechanism after a predetermined movement of said control member to lock said member against return movement to said initial position, while permitting continued movement thereof, said key operated plug being adapted to release the bolt mechanism from said means to permit movement of said control member back to its initial position, a locking bolt movable in and out of locking position by movement of said control member between its initial position and its second locked position, and an ignition circuit opened and closed by said control member in its movement beyond said second locked position.

5. In a device of the class described, a movable control member, bolt mechanism adapted to lock said member in an initial position, a key operated plug movable from a locked position to a release position and adapted in so moving to actuate said bolt mechanism to release said control member for movement in a predetermined direction, means cooperable with said bolt mechanism after predetermined movement thereof to lock said member against return to said initial position, while permitting continued movement thereof, said key operated plug being movable from its release position back to its locked position and adapted in so moving to actuate said bolt mechanism to release the bolt mechanism from said means to permit movement of said control member back to its initial position.

6. In a device of the class described, a movable control member, bolt mechanism adapted to lock said member in an initial position, a key operated plug movable from a locked position to a release position and adapted in so moving to actuate said bolt mechanism to release said control member for movement in a predetermined direction, means cooperable with said bolt mechanism after predetermined movement thereof to lock said member against return to said initial position, while permitting continued movement thereof, said key operated plug being movable from its release position back to its locked position and adapted in so moving to actuate said bolt mechanism to release the bolt mechanism from said means to permit movement of said control member back to its initial position, an electric switch, and means for operating said switch as said control member moves beyond said predetermined movement.

7. In a device of the class described, a movable control member, means whereby said member is locked in an initial position, key operated means for releasing said member from said means for movement in a predetermined direction, means whereby said member is locked against movement back to its initial position after movement to a predetermined second position, while permitting movement beyond said predetermined second position, said key operated means being operable also to release said member from said means for movement back to said initial position.

8. In a device of the class described, a movable control member, means whereby said member is locked in an initial position, key operated means for releasing said member from said means for movement in a predetermined direction, means whereby said member is locked against movement back to its initial position after movement to a predetermined second position, while permitting movement beyond said predetermined second position, said key operated means being operable also to release said member from said means for movement back to said initial position, a locking bolt movable in and out of locking position by movement of said control member between its initial position and its second locked position, and an ignition circuit opened and closed by said control member in its movement beyond said second locked position.

9. In a device of the class described, a movable control member, means whereby said member is locked in an initial position, key operated means for releasing said member from said means for movement in a predetermined direction, means whereby said member is locked against movement back to its initial position after movement to a predetermined second position, while permitting movement beyond said predetermined second position, said key operated means being operable also to release said member from said means for movement back to said initial position, and an ignition circuit opened and closed by said control member in its movement beyond said second locked position.

10. In a lock of the class described, a rotatable member, a bolt mechanism carried by said member, a key operated plug for controlling said bolt mechanism, a locking bolt connected to said rotatable member for movement thereby into and out of locking position, means cooperable with said bolt mechanism for locking said rotatable member in an initial position, said bolt mechanism being releasable from said means by rotation of said key operated plug to permit rotation of said rotatable member, means cooperable with said bolt mechanism for locking said rotatable member against movement back to its initial position once it reaches a predetermined position corresponding to a movement of said locking bolt out of locking position, an ignition circuit, means for opening and closing said ignition circuit by movement of said rotatable member beyond said predetermined position, said bolt mechanism being operable by rotation of said key operated plug to release said rotatable member for movement back to its initial position, whereby also to move said locking bolt back to its locking position.

11. In a device of the class described, a movable control member movable from a first position to a second position, and from a second position to a third position, means for locking said control member against movement from said first position to said second position, and from said second position to said first position, a key operated means adapted to release said locking means when said control member is in said first position whereby to permit movement of said member from said first position to said second position whereupon it is locked against movement back to said first position, said locking means being so constructed as to permit movement of said control member from said second position to said third position and back to said second position, said locking means being operable by said key operated means when said control member is in said second position whereby to release said member for movement back to said first position.

12. In a device of the class described, a movable control member movable from a first position to a second position, and from a second position to a third position, means for locking said member against movement from said first position to said second position, and from said second position to said first position, a key operated means adapted to release said locking means when said control member is in said first position whereby to permit movement of said control member from said first position to said second position whereupon it is locked against movement back to said first position, said locking means being so constructed as to permit movement of said control member from said second position to said third position and back to said second position, said locking means being operable by said key operated means when said member is in said second position whereby to release said control member for movement back to said first position, said locking means being automatically effective to lock said control member in said first position upon its movement back to said first position.

13. In a device of the class described, a movable control member movable from a first position to a second position, and from a second position to a third position, means for locking said control member against movement from said first position to said second position, and from said second position to said first position, a key operated means adapted to release said locking means when said control member is in said first position whereby to permit movement of said control member from said first position to said second position whereupon it is locked against movement back to said first position, said locking means being so constructed as to permit movement of said control member from said second position to said third position and back to said second position, said locking means being operable by said key operated means when said control member is in said second position whereby to release said control member for movement back to said first position, a locking device operated by said control member in its movement from said first position to said second position, and a switch operated by said control member in its movement between said second position and said third position.

14. In combination, a steering column, a locking device for locking said steering column and movable back and forth from a locking to an unlocking position, means for locking said device in steering column locking position and also against movement from steering column releasing position back to steering column locking position, and a key operated lock for releasing said device from said locking means both when it is in unlocking and in locking position whereby to control by said key operated lock the movement of said device from a locking to an unlocking position, and then from an unlocking to a locking position, the locking means allowing said device to move freely back and forth beyond said unlocking position and a third position, and an electric switch operable by said free back and forth movement.

15. In a lock of the class described, a housing, a laterally movable plunger mounted in said housing, a rotatable member, a pin and cam groove connection between said plunger and member whereby rotation of said member will move said plunger laterally, a lateral slot in said casing for guiding the pin of said pin and cam groove connection, and contact means beyond said slot operable by said pin.

16. In a lock of the class described, a housing, a laterally movable plunger mounted in said housing, a rotatable member, a pin and cam groove connection between said plunger and member whereby rotation of said member will move said plunger laterally, a loose connection between the plunger and the pin of said pin and cam groove connection, and a spring for pressing said plunger against said pin.

17. In a lock of the class described, a housing, a laterally movable plunger mounted in said housing, a rotatable member, a pin traversing a slot in said plunger and maintained against rotation and cooperating with a cam groove in said rotatable member whereby rotation of said member will move said pin laterally, a spring pressing said plunger laterally with one end of the slot against said pin whereby lateral movement of said pin will retract said bolt, while end pressure against said bolt will move it relatively to said pin against said spring pressure and for the limit of said slot.

18. In a lock of the class described, a rotatable member, a pair of independent bolts carried by said member and each pressed outwardly, a key plug carried by said member, a cam on said key plug, said cam being cooperable with said bolts to move one of said bolts to an unlocking position when the key plug is in one position, and to move the other of said bolts to an unlocking position when the key plug is in another position.

19. In a lock of the class described, a rotatable member, a pair of independent bolts carried by said member and each pressed outwardly, a key plug carried by said member, a cam on said key plug, said cam being cooperable with said bolts to move one of said bolts to an unlocking position when the key plug is in one position, and to move the other of said bolts to an unlocking position when the key plug is in another position, one of said bolts being cooperable with locking means in one position of the rotatable member, the other of said bolts being cooperable with locking means in another position of the rotatable member.

20. A lock comprising a locking bolt and an electrical switch, said switch comprising at least one contact and a movable switch-closer, a shoulder which is fixed relatively to the closer and with which the closer is interengaged to hold it in a circuit-opening position, means to move the bolt to an unlocking position, and at the same time to move the closer from its interengaged position with the shoulder, and a spring to then displace said closer to a circuit-closing position, said shoulder then obstructing the closer so that the closer acts as a detent preventing countermovement of the bolt to a locking position.

21. In a lock comprising a cylinder which has a shoulder and a groove, a pair of detents, one partly occupying the groove the other having a cut-out containing the shoulder, a locking bolt, a shaft and instrumentalities which function to move the bolt into locking and unlocking positions upon operation of the shaft, said shaft being turnably contained by the cylinder and carrying the detents, its turning being prevented while the securing detent engages the groove, confronting lugs on the detents, and means including an eccentric ring embracing the lugs, which upon being actuated moves the securing detent by means of its lug toward the other detent so as to free the shaft for turning.

22. In a device of the class described, a control member, key operated mechanism adapted to lock said member in an initial position, said mechanism upon one operation releasing said control member for movement in one direction, and means whereby said key operated lock mechanism locks said control member against reverse movement after it has moved in said direction a predetermined distance, while permitting continued movement in said direction, said mechanism upon further operation releasing said control member for reverse movement to its initial position.

23. In a lock of the class described, a locking plunger, a rotatable member, means whereby said rotatable member retracts said locking plunger, a second rotatable member at an angle to said first member and whose axis of rotation is at an angle to the axis of rotation of said first member, a gear connection between said members whereby they are rotatable together, and key operated lock mechanism for controlling the rotation of said members.

24. In a lock of the class described, a rotatable member, a pair of bolts carried by said member, a key plug for retracting said bolts and for controlling the projection of said bolts whereby to control the rotation of said rotatable member, means cooperating with one of said bolts to lock said rotatable member in a first position, rotation of said key plug retracting said bolt whereupon said member is rotatable to a second position, the other of said bolts then locking said member against rotation back to said first position, rotation of said key plug retracting said second bolt then to allow rotation of said member back to said first position, said last rotation of said key plug releasing said first bolt whereby it is projected into locking position when said rotatable member moves back to its first position, neither of said bolts preventing rotation of said rotatable member beyond said second position to a third position.

CHARLES B. LOWE.